(12) United States Patent
Hong et al.

(10) Patent No.: US 7,348,966 B2
(45) Date of Patent: Mar. 25, 2008

(54) DIGITAL RESISTIVE-TYPE TOUCH PANEL

(75) Inventors: Hee Jung Hong, Seoul (KR); Hee Jeong Park, Bucheon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 123 days.

(21) Appl. No.: 10/704,669

(22) Filed: Nov. 12, 2003

(65) Prior Publication Data

US 2004/0095336 A1    May 20, 2004

(30) Foreign Application Priority Data

Nov. 20, 2002   (KR)  .................. 10-2002-0072351

(51) Int. Cl.
| G06F 3/041 | (2006.01) |
| G06F 3/042 | (2006.01) |
| G06F 3/043 | (2006.01) |
| G06F 3/045 | (2006.01) |

(52) U.S. Cl. .................. 345/173; 345/174; 345/175; 345/176; 345/177; 345/178; 345/169.3; 345/98; 345/105

(58) Field of Classification Search ........ 345/156–173; 349/149
See application file for complete search history.

(56) References Cited

U.S. PATENT DOCUMENTS

| 5,451,724 | A   | * | 9/1995 | Nakazawa et al. ....... 178/18.05 |
| 6,057,903 | A   | * | 5/2000 | Colgan et al. ............. 349/139 |
| 6,239,788 | B1  | * | 5/2001 | Nohno et al. ............. 345/173 |
| 6,690,361 | B1  | * | 2/2004 | Kang et al. ................ 345/173 |
| 6,738,050 | B2  | * | 5/2004 | Comiskey et al. .......... 345/173 |
| 6,750,927 | B2  | * | 6/2004 | Yu et al. ..................... 349/58 |
| 6,768,533 | B2  | * | 7/2004 | Hanakawa et al. ........ 349/153 |
| 6,781,642 | B2  | * | 8/2004 | Nakanishi et al. .......... 349/12 |
| 6,867,831 | B2  | * | 3/2005 | Takizawa et al. .......... 349/106 |
| 6,914,640 | B2  | * | 7/2005 | Yu ............................... 349/12 |
| 7,034,808 | B2  | * | 4/2006 | Sakata et al. .............. 345/173 |
| 2002/0101410 | A1 | * | 8/2002 | Sakata et al. .............. 345/173 |

FOREIGN PATENT DOCUMENTS

CN    1328268 A    12/2001

* cited by examiner

*Primary Examiner*—Jin-Cheng Wang
(74) *Attorney, Agent, or Firm*—McKenna, Long & Aldridge LLP

(57) ABSTRACT

A digital resistive-type touch panel includes first and second transparent substrates opposing each other; a plurality of first transparent electrodes extending along a surface of the first transparent substrate; a plurality of second transparent electrodes extending along a surface of the second transparent substrate, wherein the first and second transparent electrodes cross each other; a first signal line for dividing an applied voltage and applying unique voltages to respective ones of the first transparent electrodes; and a plurality of second signal lines connected to respective ones of the plurality of second transparent electrodes.

23 Claims, 5 Drawing Sheets

DIGITAL RESISTIVE-TYPE TOUCH PANEL

This application claims the benefit of the Korean Application No. P2002-72351 filed on Nov. 20, 2002, which is hereby incorporated by reference for all purposes as if fully set forth herein.

BACKGROUND OF THE INVENTION

1. Field of the Invention

The present invention relates to digital resistive-type touch panels. More particularly, the present invention relates to a digital resistive-type touch panel having an increased ratio of viewing area to dead space.

2. Discussion of the Related Art

Information devices such as personal computers, mobile transmission devices, etc., use a variety of input devices such as keyboards, mice, digitizers, etc., to effect textual and other graphic processes. As the demand for information devices that are mobile and simple to use continues to increase, research into replacing relatively large input devices such as keyboards and mice has been performed to develop input devices that are easier to carry, and simpler to operate, than conventional input devices. In particular, much research has been directed to allowing information to be input via portable input devices using contact objects such as a user's finger. Recently, durable and reliable input devices have been developed that not only to satisfy general input functions, but have entirely new types of functions.

Touch panels have been developed as a means of efficiently interfacing with electronic devices via a display surface. Depending on the type of contact object used (e.g., a user's finger, a stylus, etc.), and depending on the manner in which the location of a contact point (i.e., the location where the contact object is operably proximate the touch panel) is determined, touch panels are generally classifiable as resistive-type, capacitive-type, electromagnetic (EM)-type, saw-type, and infrared-type touch panels.

Owing to their thin profile, small dimensions, and low power consumption characteristics, resistive-type touch panels are commonly integrated with liquid crystal display (LCD) devices is in applications such as electronic notebooks, personal digital assistants (PDAs), mobile PCs.

Generally, analog resistive-type touch panels include two resistive sheets (i.e., substrates) oppositely arranged and spaced apart from each other by a predetermined distance using a plurality of dot spacers. More specifically, the resistive sheets are generally formed of film-type substrates between 0.11 mm and 0.2 mm thick, glass substrates between 0.2 mm and 2 mm thick, or plastic-type substrates between 1 mm and 2 mm thick. When a contact object (e.g., a user's finger, a stylus pen, etc.) contacts a predetermined portion of an upper substrate arranged over a display surface (i.e., when a user generates a contact point), an electrode formed on the upper substrate electrically contacts an electrode formed on a lower substrate. Subsequently, a variable voltage value, corresponding to the location of the contact point, is transmitted to a control unit that calculates the coordinates of the contact point.

Contrary to analog resistive-type touch panels, digital resistive-type touch panels include a plurality of patterned transparent electrodes formed on both the upper and lower substrates so as to create a matrix pattern of transparent electrodes. When a contact object generates a contact point, predetermined ones of the patterned transparent electrodes of the upper and lower films electrically contact each other at the contact point. Subsequently, a voltage value corresponding the location of the contact point is transmitted from the upper and lower substrates to a control unit that calculates the coordinates of the contact point.

FIG. 1 schematically illustrates a related art digital resistive-type touch panel. FIG. 2 illustrates a cross-sectional view taken along line A-A' of FIG. 1.

Referring to FIG. 1, the related art digital resistive-type touch panel includes a viewing area V/A 10 having dimensions (e.g., rectangular dimensions) corresponding to a viewable display surface of an LCD device (not shown), and a dead space region 15, formed to surround the periphery of the viewing area V/A 10 and having dimensions corresponding to a non-viewable region of the LCD device.

Referring to FIG. 2, a lower substrate 1 is bonded to an upper substrate 2 via an insulating adhesive material 21 and 22 arranged in the dead space region 15. Dot spacers (not shown) are arranged between the bonded lower and upper substrates 1 and 2. A first plurality of patterned transparent electrodes 40 extend along a first direction on a lower surface of the upper substrate 2 and a second plurality of patterned transparent electrodes 30 extend along a second direction on an upper surface of the lower substrate 1, wherein the second direction is generally perpendicular to the first direction.

During operation of the digital resistive-type touch panel, a unique voltage is applied from a signal line 7 to each of the first plurality of patterned transparent electrodes 40 such that, when a predetermined portion of the upper substrate 2 is contacted with a contact object (e.g., a user's finger, a pen, etc.), one of the first plurality of patterned transparent electrodes 40 electrically contacts one of the second plurality of patterned transparent electrodes 30 at a location corresponding to the contact point generated by the contact object. Accordingly, a unique voltage value is transmitted by the lower substrate 1 to the signal line 7, wherein the transmitted voltage value corresponds to X and Y coordinates of the generated contact point. As is evident from the discussion above, if a contact point is generated by a contact object in a region of the touch panel where the first and second plurality of patterned transparent electrodes 30 and 40 are not formed, it is impossible to determine the coordinates of the contact point.

FIGS. 3A and 3B illustrate plan views of the related art digital resistive-type touch panel lower and upper substrates and the plurality of patterned transparent electrodes formed thereon.

Referring to FIG. 3A, the first plurality of patterned transparent electrodes 40 are formed within the viewing area 10 of the upper substrate 2. Moreover, the first plurality of patterned transparent electrodes 40 are spaced apart from each other by a predetermined distance and extend over the surface of the upper substrate 2 along a first direction (e.g., an X-axis direction). A first plurality of signal lines 7a are arranged within the dead space region 15 for transmitting unique voltages to respective ones of the first plurality of patterned transparent electrodes 40.

Referring to FIG. 3B, the second plurality of patterned transparent electrodes 30 are formed within the viewing area 10 of the lower substrate 1. Moreover, the second plurality of patterned transparent electrodes 30 are spaced apart from each other by a predetermined distance and extend over the surface of the lower substrate 1 along a second direction perpendicular to the first direction (e.g., a Y-axis direction). A second plurality of signal lines 7b are arranged within the dead space region 15 for transmitting a voltage applied from one of the first plurality of patterned transparent electrodes 40 and transmitted by a respective one of the second plurality of patterned transparent electrodes 30.

Generally, the first and second plurality of patterned transparent electrodes 30 and 40 are formed by selectively patterning a transparent conductive layer such as Indium-Tin-Oxide (ITO) while the first and second plurality of signal lines 7a and 7b are formed of a low sheet resistance material such as silver (Ag). The first and second plurality of signal lines 7a and 7b are connected between their respective patterned transparent electrodes 30 and 40 and a Flexible Printed Cable (FPC) film (not shown) provided at one side of the touch panel.

Moreover, the upper substrate 2 is formed of flexible plastic film such as Polyethylene Terephtalate (PET) while the lower substrate 1 is formed of a flexible PET film, or a thin glass substrate. By forming the lower substrate 1 out of the thin glass substrate, isotropic optical properties are realized. Accordingly, the reflectivity of the lower substrate 1 can be decreased by forming a polarizing plate (not shown) on the thin glass substrate. Recently, however, plastic films having isotropic optical properties have been developed and used as materials from which the lower substrate 1 can be formed.

Use of the aforementioned related art digital resistive-type touch panel is disadvantageous, however, because, the first and second plurality of signal lines 7a and 7b must apply voltage signals to respective ones of the patterned transparent electrodes 30 and 40, wherein the plurality of signal lines 7a and 7b are connected to an FPC film arranged at one side of the touch panel. As a result, an excessively large dead space region 15 is required to accommodate the first and second plurality of signal lines and the size of the viewing area 10 is undesirably reduced. Moreover, when the plurality of signal lines are arranged along one direction as shown in FIGS. 3A and 3B, the signal lines connected to the patterned transparent electrode arranged farthest from the FPC become relatively longer than other ones of the signal lines, thereby distorting signals they transmit

SUMMARY OF THE INVENTION

Accordingly, the present invention is directed to a digital resistive-type touch panel that substantially obviates one or more of the problems due to limitations and disadvantages of the related art.

An advantage of the present invention provides a digital resistive-type touch panel having an increased ratio of viewing area to dead space region by restructuring signal lines that apply voltages to patterned electrodes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a digital resistive-type touch panel may, for example, include a first transparent substrate having a first surface; a second transparent substrate having a second surface opposing the first surface; first transparent electrodes extending along a first direction on the first surface; second transparent electrodes extending along a second direction on the second surface, wherein the second direction is substantially perpendicular to the first direction; a first signal line connected to the first transparent electrodes, wherein unique voltages are transmittable to respective ones of first transparent electrodes via the first signal line; and second signal lines connected to respective ones of the second transparent electrodes.

In one aspect of the present invention, the first signal line may, for example, include a main line having a predetermined pattern and supplementary lines connecting the first transparent electrodes to the main line.

In another aspect of the present invention, the supplementary lines may be spaced apart from each other by a predetermined distance.

In still another aspect of the present invention, the digital resistive-type touch panel may further include power lines, wherein a power source voltage and a ground voltage are appliable to the opposing ends of the main line via the power lines.

In yet another aspect of the present invention, the main line and the supplementary lines may be formed of a material (e.g., Indium-Tin-Oxide (ITO), etc.) having a first resistance value, and the power lines may be formed of a material having a second resistance value lower than the first resistance value (e.g., Ag, etc.).

In still a further aspect of the present invention, the predetermined pattern of the main line include a linear pattern.

In yet a further aspect of the present invention, the predetermined pattern of the main line include a tortuous pattern.

In still a further aspect of the present invention, the touch panel may be integrated with a display device, wherein the first transparent electrodes may be arranged substantially parallel to data lines of the display device and wherein the second transparent electrodes may be arranged substantially parallel to gate lines of the display device.

In still another aspect of the present invention, the width of each of the first and second transparent electrodes may be substantially the same as the width of each pixel of the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

According to principles of the present invention, the touch panel herein described may be integrated with a display device such as a liquid crystal display (LCD) device. It will be readily appreciated, however, that the concepts of the present invention may be readily extended to integrate the touch panel with substantially any type of display device such as a Cathode Ray Tube (CRT), Plasma Display Panel (PDP), Electro Luminescent Display (ELD), Vacuum Fluorescent Display (VFD), and the like.

Figure 4A:
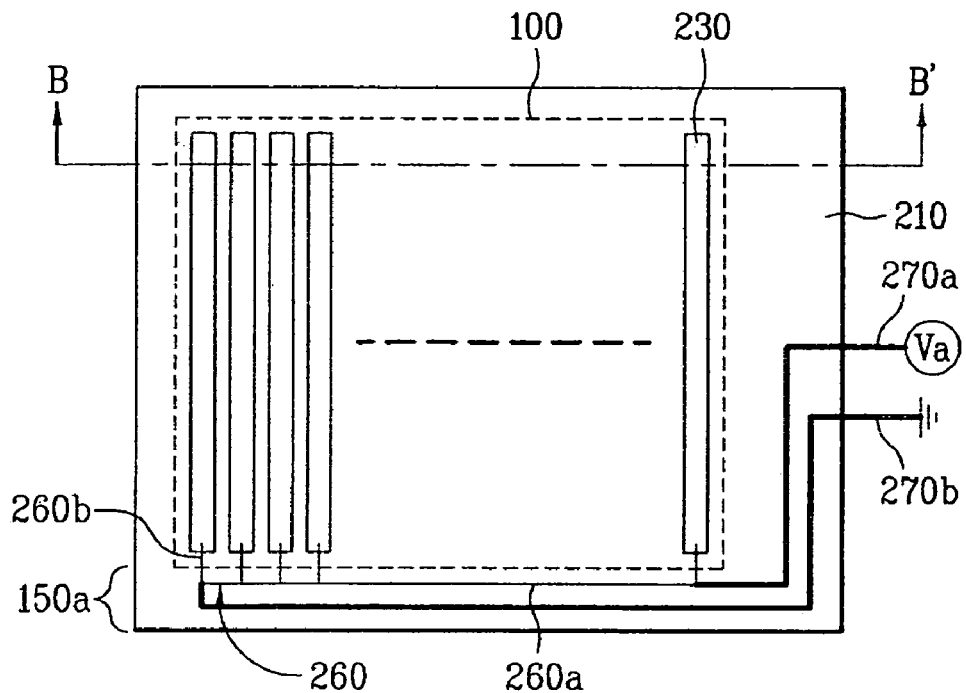
FIGS. 4A and 4B illustrate plan views of lower and upper substrates and the plurality of patterned transparent electrodes in accordance with principles of a first embodiment of the present invention.
Figure 4B:
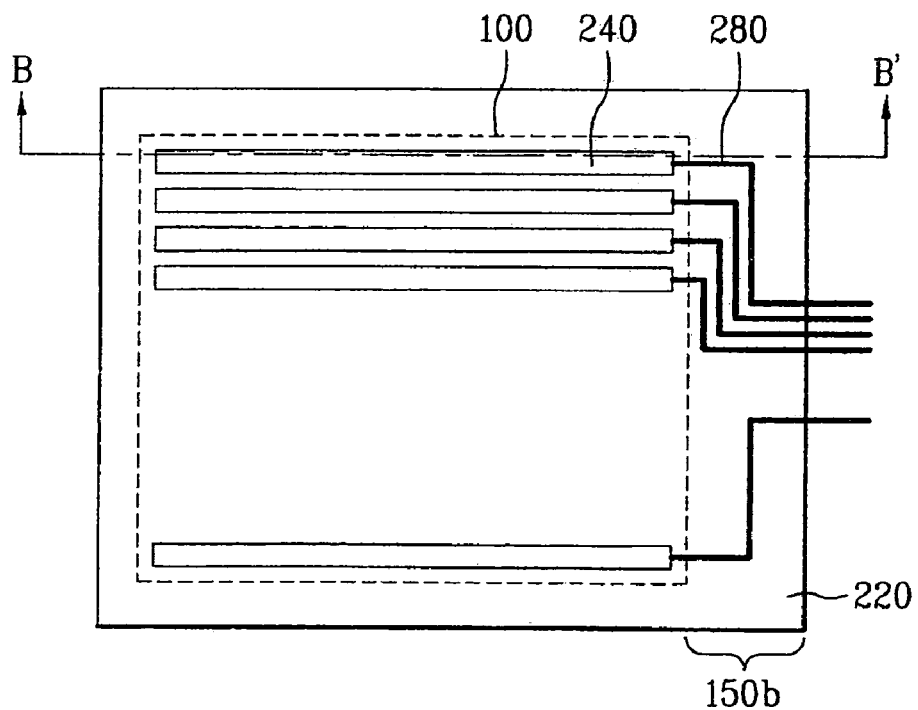
Figure 5:
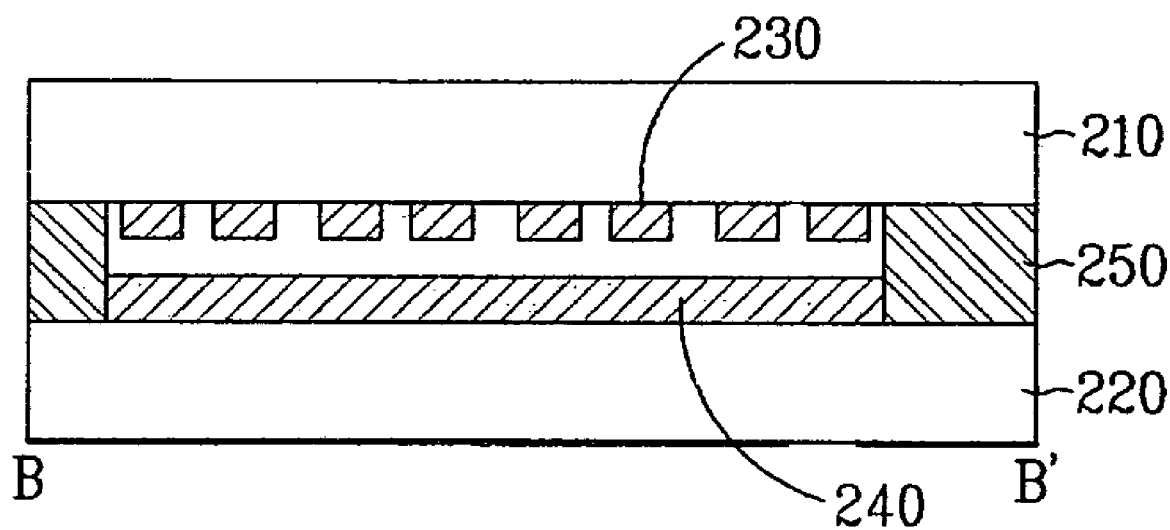
FIG. 5 illustrates a cross-sectional view taken along line B-B' of FIGS. 4A and 4B.

FIGS. 4A and 4B illustrate plan views of lower and upper substrates and the plurality of patterned transparent electrodes in accordance with principles of a first embodiment of the present invention. FIG. 5 illustrates a cross-sectional view taken along line B-B' of FIGS. 4A and 4B.

Referring to FIGS. 4A and 4B, a first plurality of patterned transparent electrodes 230 may be arranged on a first surface of an upper substrate 210. Moreover, the first plurality of patterned transparent electrodes 230 may be spaced apart from each other by a predetermined distance along a first direction (e.g., an X-axis) and extend over the first surface of the upper substrate 210 along a second direction substantially perpendicular to the first direction (e.g., an Y-axis direction). In another aspect of the present invention, however, the first plurality of patterned transparent electrodes 230 may be spaced apart from each other by a predetermined distance along the second direction and extend over the first surface of the upper substrate 210 along the first direction.

A second plurality of patterned transparent electrodes 240 may be arranged on a second surface of a lower substrate 220. Moreover, the second plurality of patterned transparent electrodes 240 may be spaced apart from each other by a predetermined distance along the second direction and extend over the second surface of the lower substrate 220 along the first direction. In another aspect of the present invention, the second plurality of patterned transparent electrodes 240 may be spaced apart from each other by a predetermined distance along the first direction and extend over the second surface of the lower substrate 220 along the second direction.

Accordingly, the first and second plurality of patterned transparent electrodes 230 and 240, respectively, may enable detection of X- and Y-axis coordinates of a generated contact point. In one aspect of the present invention, dimensions defined where the first and second plurality of patterned transparent electrodes 230 and 240 cross each other may correspond substantially to dimensions of a pixel in a display device (not shown) provided below the touch panel.

During operation of the touch panel described above, when a contact object (e.g., a user's finger, a pen, etc.) contacts the digital resistive-type touch panel at a location to generate a contact point, predetermined ones of the first and second plurality of transparent electrode patterns 230 and 240 electrically contact each other at the contact point. Accordingly, a unique voltage, specific to the location of the contact point, may be detected and used to determine the coordinates of the contact point, as will be described in greater detail below.

Still referring to FIG. 4A, a first signal line 260 comprise a main line 260a and a plurality of supplementary lines 260b. The main line 260a may be connected to first end portions of the first plurality of patterned transparent electrodes 230 via respective ones of the plurality of supplementary lines 260b. In one aspect of the present invention, the main line 260a may be connected to the first plurality of patterned transparent electrodes 230 and may transmit unique voltages to individual ones of the first plurality of patterned electrodes 230. In another aspect of the present invention, power lines 270a and 270b may be connected to opposing ends of the main line 260a to apply a power source voltage Va and a ground voltage GND to the first signal line 260. Referring to FIG. 4B, a plurality of second signal lines 280 may be electrically connected to respective ones of the second plurality of patterned transparent electrodes 240.

According to principles of the present invention, the first signal line 260 and the power lines 270a and 270b may be formed of metal materials having predetermined electrical resistances. In one aspect of the present invention, the first signal and power lines 260, 270a and 270b may be formed of a material having a relatively high electrical resistance, such as Indium-Tin-Oxide (ITO), or the like. Thus, according to principles of the present invention, the first signal line 260 may divide an applied voltage and transmit unique voltages to the first plurality of patterned transparent electrodes 230. In another aspect of the present invention, the first signal line 260 may be formed of a metal material having relatively high electrical resistance while the power lines 270a and 270b may be formed of a metal material having a relatively low electrical resistance such as silver (Ag), or the like. Thus, according to principles of the present invention, externally provided voltage signals, transmitted to the first signal line 260 from the power lines 270a and 270b, may be prevented from becoming distorted thereby minimizing the distortion of a signal applied from the first signal line 260 to the first plurality of patterned transparent electrodes 230.

Figure 1:
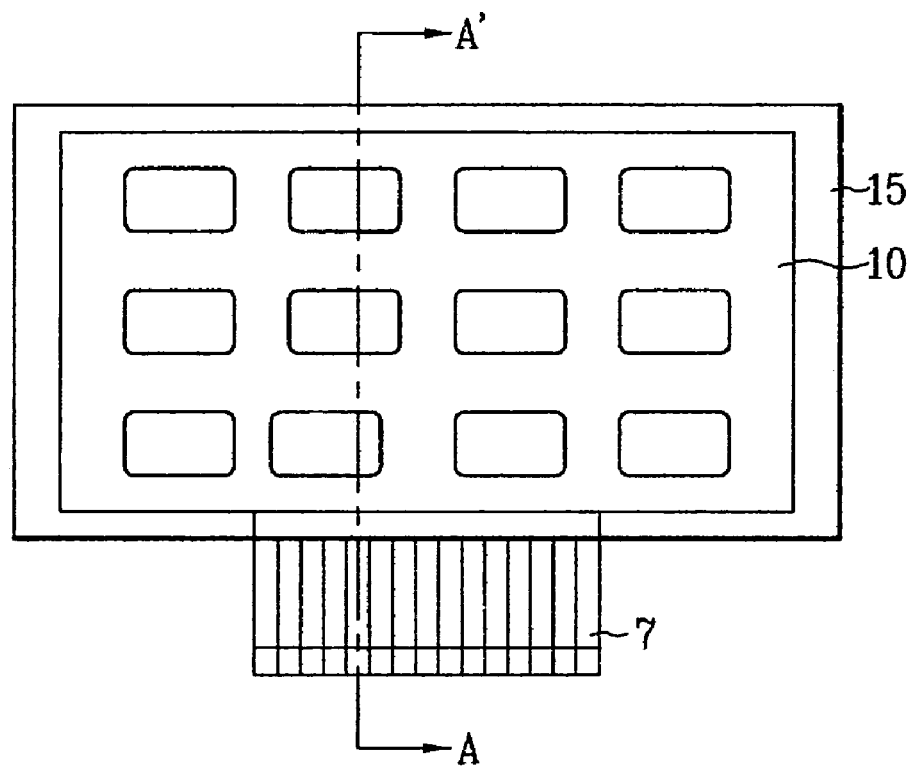
FIG. 1 schematically illustrates a related art digital resistive-type touch panel.
Figure 2:
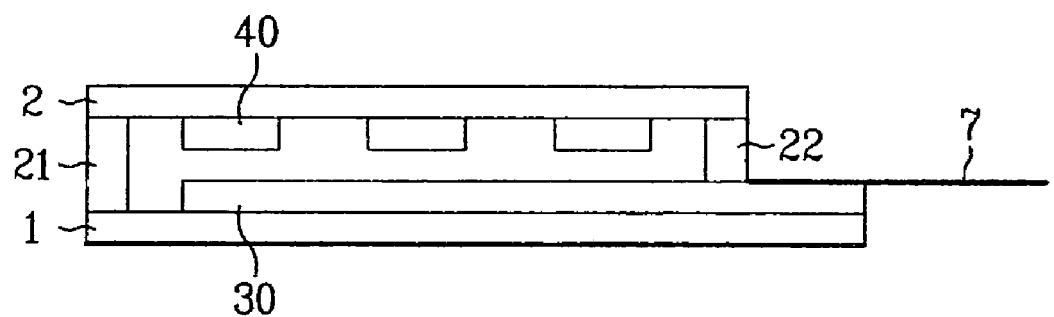
FIG. 2 illustrates a cross-sectional view taken along line A-A' of FIG. 1.
Figure 3A:
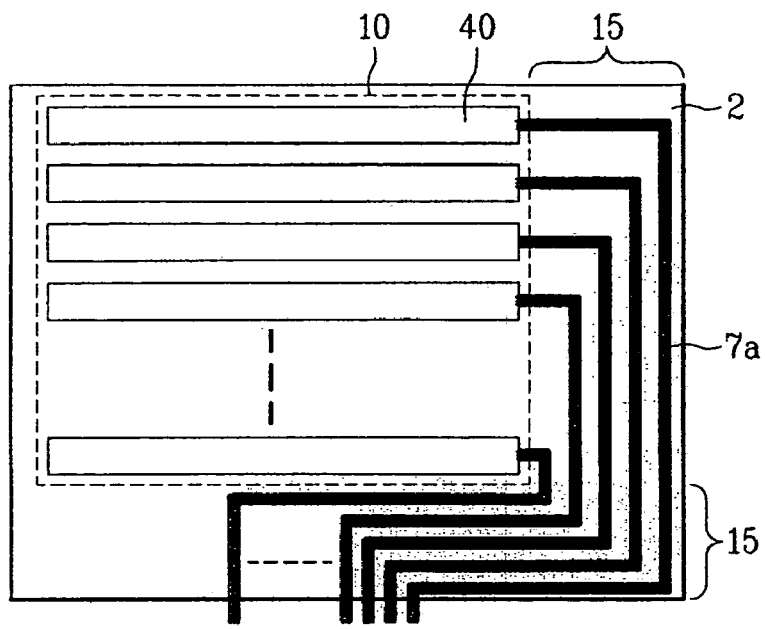
FIGS. 3A and 3B illustrate plan views of lower and upper substrates of the related art digital resistive-type touch panel and the plurality of patterned transparent electrodes formed thereon.
Figure 3B:
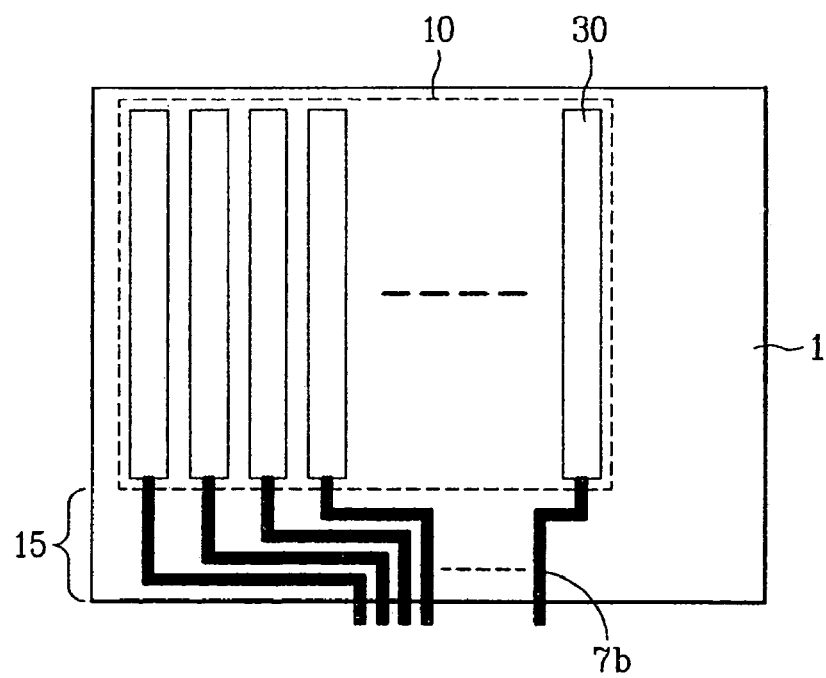

As shown in FIG. 4A, the first signal and power lines 260, 270a and 270b may occupy less area of the upper substrate 210 in a first dead space region 150a than the first plurality of signal lines 7a arranged in a corresponding portion of the dead space region 15 shown in FIG. 3A. As shown in FIG. 4B, the second signal lines 280 may occupy an area of the lower substrate 220 outside the viewing area 100 (e.g., in second dead space region 150b). Accordingly, the ratio of the size of the viewing area to the size of the area occupied by the dead space region surrounding the viewing area may be maximized.

FIG. 5 illustrates a cross-sectional view taken along line B-B' of FIGS. 4A and 4B.

Referring to FIG. 5, and as mentioned above, the first and second plurality of patterned transparent electrodes 230 and 240 may be formed on the first and second surfaces of the upper and lower substrates 210 and 220, respectively. Further, the first and second plurality of patterned transparent electrodes 230 and 240 may be arranged perpendicular to each other.

According to principles of the present invention, the touch panel may be fabricated by providing the upper substrate 210 as a flexible film formed of a material such as PET, etc., the lower substrate 220 may be provided as a flexible film formed of a material such as PET, as a thin glass substrate, or the like. The aforementioned first and second plurality of patterned transparent electrodes 230 and 240 may be provided by depositing conductive layers onto the first and second surfaces of the upper and lower substrates 210 and 220, respectively, following by a photolithographic patterning of the deposited conductive layers. Subsequently, the upper and lower substrates 210 and 220 may be bonded to each other via a double-sided adhesive material 250 arranged within a dead space region (e.g., a non-display region) of the touch panel.

During operation of the touch panel described above, a DC voltage may be applied from the power lines 270a and 270b to the opposing ends of the main line 260a. Subsequently, the applied voltage may be divided by the main line 260a such that a unique voltage is transmitted to respective ones of the first plurality of patterned transparent electrodes 230. In one aspect of the present invention, the transmitted voltage may be divided in accordance with an internal resistance value of the main line 260a. Accordingly, the applied voltage may be divided and transmitted to the first plurality of patterned transparent electrodes 230 as a plurality of unique voltages in accordance with the distance of portions main line 260a, connected to the first plurality of patterned transparent electrodes 230 via the supplementary lines 260b, from the power source voltage Va of the power line 270a.

When a portion (i.e., a contact point) of the upper substrate 210 is contacted with a contact object (e.g., a user's finger, a pen, etc.), one of the first plurality of patterned transparent electrodes 230 electrically contacts one of the second plurality of patterned transparent electrodes 240 at the contact point. Subsequently, the electrically contacted one of the second plurality of patterned transparent electrodes 240 may output a voltage corresponding to the location of the contact point. Based on the outputted voltage, X- and Y-axis coordinates of the generated contact point may be determined.

Figure 6:
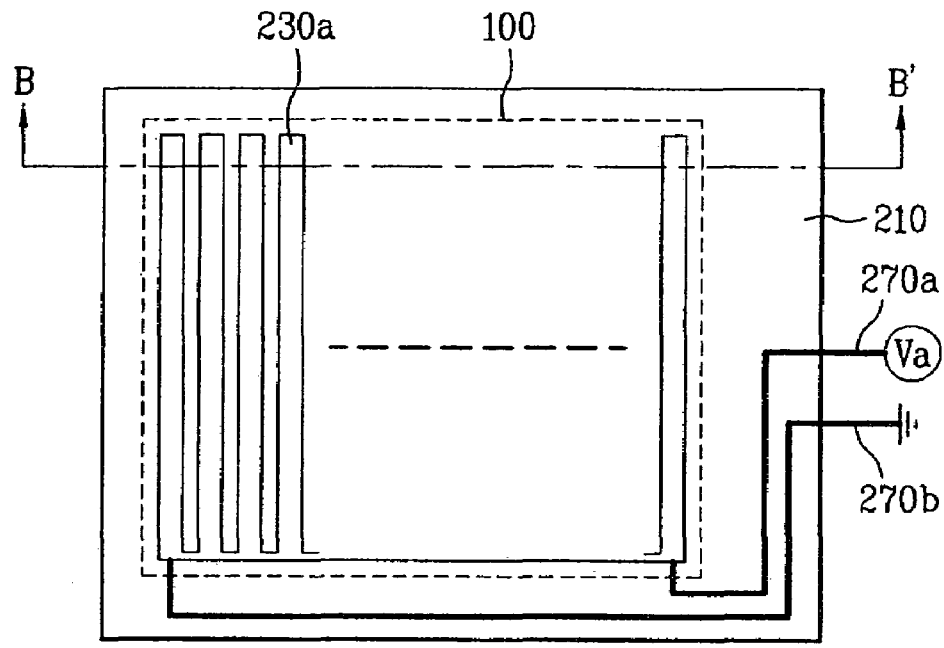
FIG. 6 illustrates a plan view of an upper substrate of a digital resistive-type touch panel in accordance with principles of a second embodiment of the present invention.

FIG. 6 illustrates a plan view of an upper substrate of a digital resistive-type touch panel in accordance with principles of a second embodiment of the present invention.

Referring to FIG. 6, a digital resistive-type touch panel according to a second embodiment of the present invention may differ from the aforementioned digital resistive-type touch panel according to the first embodiment of the present invention in that first end portions of the first plurality of patterned transparent electrodes 230 shown in FIG. 4A may be connected to each other to form a first transparent electrode pattern 230a. Further, according to the second embodiment of the present invention, the power source voltage Va and a ground voltage GND may be applied to opposing ends of the first transparent electrode pattern 230a via power lines 270a and 270b.

In one aspect of the present invention, the first transparent electrode pattern 230a may be formed by connecting the respective first end portions of the first plurality of patterned transparent electrodes 230 shown in FIG. 4A via a lower line. In another aspect of the present invention, the lower line may be narrower than individual ones of the first plurality of patterned transparent electrodes 230. In still another aspect of the present invention, the lower line may be formed of the same material as the transparent electrodes 230. Accordingly, the lower line may divide a voltage transmitted by the power lines 270a and 270b in accordance with an internal resistance value of the aforementioned lower line and applied to the first transparent electrode pattern 230a.

Figure 7:
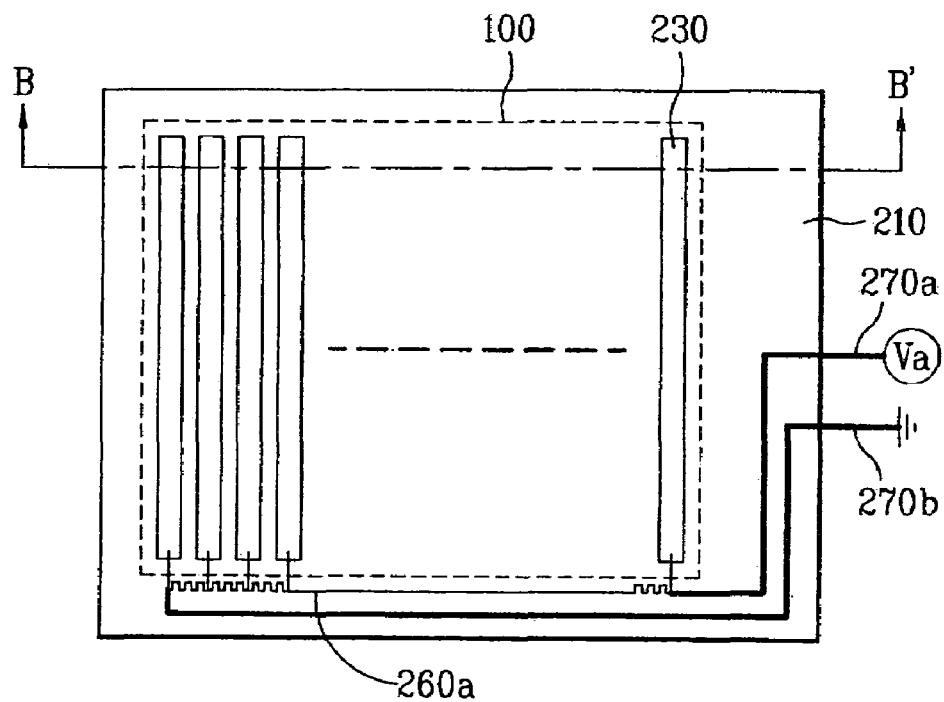
FIG. 7 illustrates a plan view of an upper substrate of a digital resistive-type touch panel in accordance with principles of a third embodiment of the present invention.

FIG. 7 illustrates a plan view of an upper substrate of a digital resistive-type touch panel in accordance with principles of a third embodiment of the present invention.

Referring to FIG. 7, a digital resistive-type touch panel according to a third embodiment of the present invention may differ from the digital resistive-type touch panel according to the first embodiment of the present invention in that the main line 260a of the first signal line 260 shown in FIG. 4A may be formed in a tortuous pattern 260a. By providing the tortuous main line 260a, the length of conductor between adjacent ones of the first plurality of patterned transparent electrodes 230 may be increased. In one aspect of the present invention, the main line 260a may be formed of a metal material having an electrical resistance less than a material such as ITO.

According to principles of the present invention, use of the digital resistive-type touch panel is advantageous because dimensions defined where the patterned transparent electrodes 230 and 240 cross each other may correspond substantially to dimensions of a pixel of a display device (not shown) arrange-able below the touch panel of the present invention. For example, an area defined by crossings of the transparent electrodes 230 and 240 may be the same as that of a corresponding pixel. Accordingly, a resolution to which images are displayable by an LCD panel may be substantially equal to a resolution to which images are displayable by the LCD panel through the touch panel.

Further, a voltage applied to a signal line may be divided according to an internal resistance of the signal line. Accordingly, the digital resistive-type touch panel of the present invention may maximize the size of the viewing area with respect to the dead space region. As a result, the digital resistive-type touch panel may be suitable for use in small-sized touch panels.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A digital resistive-type touch panel, comprising:
   a first substrate having a first surface;
   a second substrate having a second surface opposing the first surface;
   a plurality of first transparent electrodes extending along a first direction on the first surface;
   a plurality of second transparent electrodes extending along a second direction on the second surface, wherein the second direction is substantially perpendicular to the first direction;
   a first signal line including:
      a main line having a predetermined orientation with respect to the first direction; and
      a plurality of supplementary lines, each supplementary line of the plurality in direct contact with a respective one of the plurality of first transparent electrodes and connected to the main line;
   a plurality of second signal lines connected to respective ones of the plurality of second transparent electrodes, and
   first and second power lines respectively connected to opposing ends of the main line,
   wherein the main line divides a voltage from the first power line into unique voltages in accordance with an internal resistance value of the main line and supplies a respective one of the unique voltages to each of the plurality of the first transparent electrodes via a respective supplemental line of the plurality of supplemental lines, and wherein only one of the second transparent electrodes outputs a voltage corresponding to a location of a contact point between the one of the second transparent electrodes and one of the first transparent electrodes.

2. The digital resistive-type touch panel of claim 1, wherein the plurality of supplementary lines are spaced apart from each other by a predetermined distance.

3. The digital resistive-type touch panel of claim 1, wherein the first and second power lines respectively connect a power source voltage and a ground voltage are to opposing ends of the main line.

4. The digital resistive-type touch panel of claim 3, wherein
the main line and the supplementary lines comprise a material having a first resistance value; and
the first and second power lines comprise a material having a second resistance value, wherein the second resistance value is less than the first resistance value.

5. The digital resistive-type touch panel of claim 3, wherein the power lines comprise silver (Ag).

6. The digital resistive-type touch panel of claim 1, wherein the main line comprises Indium-Tin-Oxide (ITO).

7. The digital resistive-type touch panel of claim 1, wherein the plurality of supplementary lines comprise Indium-Tin-Oxide (ITO).

8. The digital resistive-type touch panel of claim 1, wherein the main line comprises a straight pattern.

9. The digital resistive-type touch panel of claim 1, wherein the main line comprises a tortuous pattern.

10. The digital resistive-type touch panel of claim 1, wherein the touch panel is integrated with a display device.

11. The digital resistive-type touch panel of claim 10, wherein the display device includes a cathode ray tube (CRT).

12. The digital resistive-type touch panel of claim 10, wherein the display device includes a plasma display panel (PDP).

13. The digital resistive-type touch panel of claim 10, wherein the display device includes an electro luminescent display (ELD).

14. The digital resistive-type touch panel of claim 10, wherein the display device includes a vacuum fluorescent display (VFD).

15. The digital resistive-type touch panel of claim 10, wherein the display device includes a liquid crystal display (LCD) device.

16. The digital resistive-type touch panel of claim 15, wherein the LCD device includes:

a plurality of data lines; and
a plurality of gate lines.

17. The digital resistive-type touch panel of claim 16, wherein
the plurality of first transparent electrodes are arranged substantially parallel to the plurality of data lines; and
the plurality of second transparent electrodes are arranged substantially parallel to the plurality of gate lines.

18. The digital resistive-type touch panel of claim 10, wherein the first and second transparent electrodes have substantially the same width as that of each pixel of the display device.

19. The digital resistive-type touch panel of claim 18, wherein the width of the first and second transparent electrodes is substantially the same of each pixel of the display device.

20. The touch panel of claim 1, wherein X- and Y-axis coordinates of the contact point are determined from the voltage output from the one of second transparent electrodes that outputs the voltage.

21. A touch panel, comprising:
a first transparent electrode pattern comprising a plurality of first transparent electrodes extending along a first direction, and a lower line connected to the plurality of first transparent electrodes;
a plurality of second transparent electrodes extending along a second direction;
a first and second power lines respectively connected to opposing ends of the lower line; and
a plurality of second signal lines connected to the plurality of second transparent electrodes, wherein the lower line divides a voltage from the first power line into unique voltages in accordance with an internal resistance value of the lower line and supplies each of the unique voltages to a respective one of the plurality of the first transparent electrodes, and
wherein one of the second transparent electrodes outputs a voltage corresponding to a location of a contact point between the one of the second transparent electrodes and the first transparent electrode pattern.

22. The touch panel of claim 21, wherein the plurality of first transparent electrodes include the same material as the lower line.

23. The touch panel of claim 21, wherein X- and Y-axis coordinates of the contact point are determined from the voltage output from the one of second transparent electrodes that outputs the voltage.

* * * * *